US012591356B2

(12) United States Patent
Huh et al.

(10) Patent No.: US 12,591,356 B2
(45) Date of Patent: Mar. 31, 2026

(54) ELECTRONIC DEVICE FOR PERFORMING SCREEN CAPTURE AND METHOD FOR CAPTURING SCREEN BY ELECTRONIC DEVICE

(71) Applicant: Samsung Electronics Co., Ltd., Suwon-si (KR)

(72) Inventors: Eunjung Huh, Suwon-si (KR); Younghak Oh, Suwon-si (KR); Seungyong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 18/359,274

(22) Filed: Jul. 26, 2023

(65) Prior Publication Data

US 2023/0367459 A1      Nov. 16, 2023

Related U.S. Application Data

(63) Continuation of application No. PCT/KR2022/001408, filed on Jan. 26, 2022.

(30) Foreign Application Priority Data

Jan. 26, 2021     (KR) ........................ 10-2021-0011058

(51) Int. Cl.
 *G06F 3/0484* (2022.01)
 *G06F 3/0482* (2013.01)
(52) U.S. Cl.
 CPC .......... *G06F 3/0484* (2013.01); *G06F 3/0482* (2013.01)
(58) Field of Classification Search
 CPC .............................. G06F 3/0484; G06F 3/0482
 See application file for complete search history.

(56) References Cited

U.S. PATENT DOCUMENTS 6,900,807 B1 * 5/2005 Liongosari .............. G06F 16/93
                                                      707/E17.082
9,798,708 B1  10/2017 Sharifi et al.
 (Continued)

FOREIGN PATENT DOCUMENTS

CN        110737386 A      1/2020
JP        2020-052447      4/2020
 (Continued)

OTHER PUBLICATIONS

Extended European Search Report dated Apr. 9, 2024 issued in European Patent Application No. 22746231.4.
 (Continued)

*Primary Examiner* — William L Bashore
*Assistant Examiner* — Gregory A Distefano
(74) *Attorney, Agent, or Firm* — Nixon & Vanderhye P.C.

(57) ABSTRACT

According to an embodiment, an electronic device may comprise: a display, a memory, and at least one processor, wherein the at least one processor is configured to: store, as a crop use pattern in the memory, a history of information relating to at least one first object included in a cropped area of a first screen captured by a first screen capture trigger and a history of a first task executed with respect to the cropped area; identify a second screen capture trigger while the display is displaying a second screen; in response to the second screen capture trigger, analyze at least one second object included in the second screen; based on the at least one second object and the crop use pattern, display a recommended crop area, including at least one third object that is at least a part of the at least one second object, visually differently from the remaining area of the second screen; and based on the crop use pattern, display at least one recommended task executable for the at least one third object.

20 Claims, 24 Drawing Sheets

(56)                    References Cited

U.S. PATENT DOCUMENTS

| | | | |
|---|---|---|---|
| 2008/0235585 A1 | 9/2008 | Hart et al. | |
| 2010/0251102 A1 | 9/2010 | Chen et al. | |
| 2011/0188742 A1* | 8/2011 | Yu | G06F 18/23 |
| | | | 382/190 |
| 2014/0122471 A1* | 5/2014 | Houston | G06F 16/958 |
| | | | 707/731 |
| 2014/0372902 A1* | 12/2014 | Bryant | G06Q 30/0267 |
| | | | 715/748 |
| 2015/0205772 A1 | 7/2015 | Leventhal | |
| 2016/0314504 A1* | 10/2016 | Clark | H04L 51/52 |
| 2016/0357406 A1* | 12/2016 | Lee | G06V 10/17 |
| 2017/0053167 A1 | 2/2017 | Ren et al. | |
| 2017/0060355 A1* | 3/2017 | Padmanabhan | H04L 67/125 |
| 2017/0062010 A1 | 3/2017 | Pappu et al. | |
| 2017/0103560 A1 | 4/2017 | Kraft et al. | |
| 2019/0129940 A1* | 5/2019 | Hewitt | G06N 5/02 |
| 2019/0147305 A1 | 5/2019 | Lu et al. | |
| 2019/0327526 A1* | 10/2019 | Navin | H04N 21/25891 |
| 2020/0081609 A1* | 3/2020 | Kumar | G06F 3/0481 |
| 2020/0089936 A1* | 3/2020 | Noda | H04N 1/00442 |
| 2020/0101378 A1 | 4/2020 | Hsueh | |
| 2020/0143353 A1 | 5/2020 | Van Os et al. | |
| 2020/0364454 A1 | 11/2020 | Mousavian et al. | |
| 2021/0003718 A1* | 1/2021 | Xu | H04N 21/4524 |
| 2021/0117073 A1 | 4/2021 | Jung et al. | |
| 2022/0043544 A1 | 2/2022 | Su | |
| 2022/0334697 A1 | 10/2022 | Xu et al. | |

FOREIGN PATENT DOCUMENTS

| | | |
|---|---|---|
| KR | 20180042254 A | 4/2018 |
| KR | 101947553 B1 | 2/2019 |
| KR | 20190013390 A | 2/2019 |
| KR | 20190126267 A | 11/2019 |
| KR | 20200039814 A | 4/2020 |
| KR | 102327428 B1 | 11/2021 |
| WO | 2016/191737 | 12/2016 |

OTHER PUBLICATIONS

International Search Report for PCT/KR2022/001408 mailed May 3, 2022, 4 pages.
Written Opinion of the ISA for PCT/KR2022/001408 mailed May 3, 2022, 3 pages.

\* cited by examiner

410a 431b  410b  422b 432b  433b  434b  430b 510b
520b
530b
531b
532b
533b
534b 510c
520c
530c
531c
532c
533c
534c

— 610a

— 621a

— 622a

— 623a

ELECTRONIC DEVICE FOR PERFORMING SCREEN CAPTURE AND METHOD FOR CAPTURING SCREEN BY ELECTRONIC DEVICE

CROSS-REFERENCE TO RELATED APPLICATIONS

This application is a continuation of International Application No. PCT/KR2022/001408 designating the United States, filed on Jan. 26, 2022, in the Korean Intellectual Property Receiving Office and claiming priority to Korean Patent Application No. 10-2021-0011058, filed on Jan. 26, 2021, in the Korean Intellectual Property Office, the disclosures of which are incorporated by reference herein in their entireties.

BACKGROUND

Field

The disclosure relates to an electronic device that performs screen capture and a method for capturing a screen in the electronic device.

Description of Related Art

As various functions related to screen capture are provided in an electronic device that performs screen capture, the user is required to select a desired function from among a variety of supported functions. For example, the user is required to make an input for selecting the format in which the user displays the object displayed on the screen, as one of, e.g., text, an image, or a table. As another example, the user is required to make an input as to what subsequent task to perform on the captured object.

SUMMARY

Embodiments of the disclosure provide an electronic device that may store information regarding objects included in the area cropped by the user on the captured surface and a history regarding subsequent tasks performed on the cropped area and, when a new screen capture trigger is generated, display a recommendation crop area and a recommendation task based on the stored history.

According to an embodiment, an electronic device may comprise: a display, a memory, and at least one processor. The at least one processor may be configured to: store, in the memory, a history of information about at least one first object included in a cropped area of a first screen captured by a first screen capture trigger and a history of a first task performed on the cropped area as a crop use pattern, identify a second screen capture trigger while displaying a second screen on the display, analyze at least one second object included in the second screen in response to the second screen capture trigger, display a recommendation crop area including at least one third object which includes at least some of the at least one second object visually differently from a remaining area of the second screen based on the at least one second object and the crop use pattern, and control the display to display at least one recommendation task performable on the at least one third object, based on the crop use pattern.

According to an embodiment, a method performed by at least one processor included in an electronic device may comprise: storing, in a memory of the electronic device, a history of information about at least one first object included in a cropped area of a first screen captured by a first screen capture trigger and a history of a first task performed on the cropped area as a crop use pattern, identifying a second screen capture trigger while displaying a second screen on a display of the electronic device, analyzing at least one second object included in the second screen in response to the second screen capture trigger, displaying a recommendation crop area including at least one third object which includes at least some of the at least one second object visually differently from a remaining area of the second screen based on the at least one second object and the crop use pattern, and displaying at least one recommendation task performable on the at least one third object, based on the crop use pattern.

According to an embodiment, an electronic device may comprise: a display, a memory, and at least one processor. The at least one processor may be configured to: identify a screen capture trigger while displaying a first execution screen corresponding to a first application on the display, analyze at least one first object included in the first execution screen, and control the display to display a recommendation crop area including at least one second object which includes at least some of the at least one first object visually differently from a remaining area of the first execution screen based on context information about the electronic device and a result of analysis of the at least one object.

According to an embodiment, there are provided an electronic device performing screen capture and a method for capturing a screen in the electronic device. According to an example embodiment, an electronic device may store information regarding objects included in the area cropped by the user on the captured surface and a history regarding subsequent tasks performed on the cropped area and, when a new screen capture trigger is generated, display a recommendation crop area and a recommendation task based on the stored history. Since a recommendation crop area and a recommendation task are automatically designated as default when the user designates a crop area or designates a subsequent task to be performed on the cropped area, the user may specify an object and/or subsequent task to be captured with fewer inputs.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
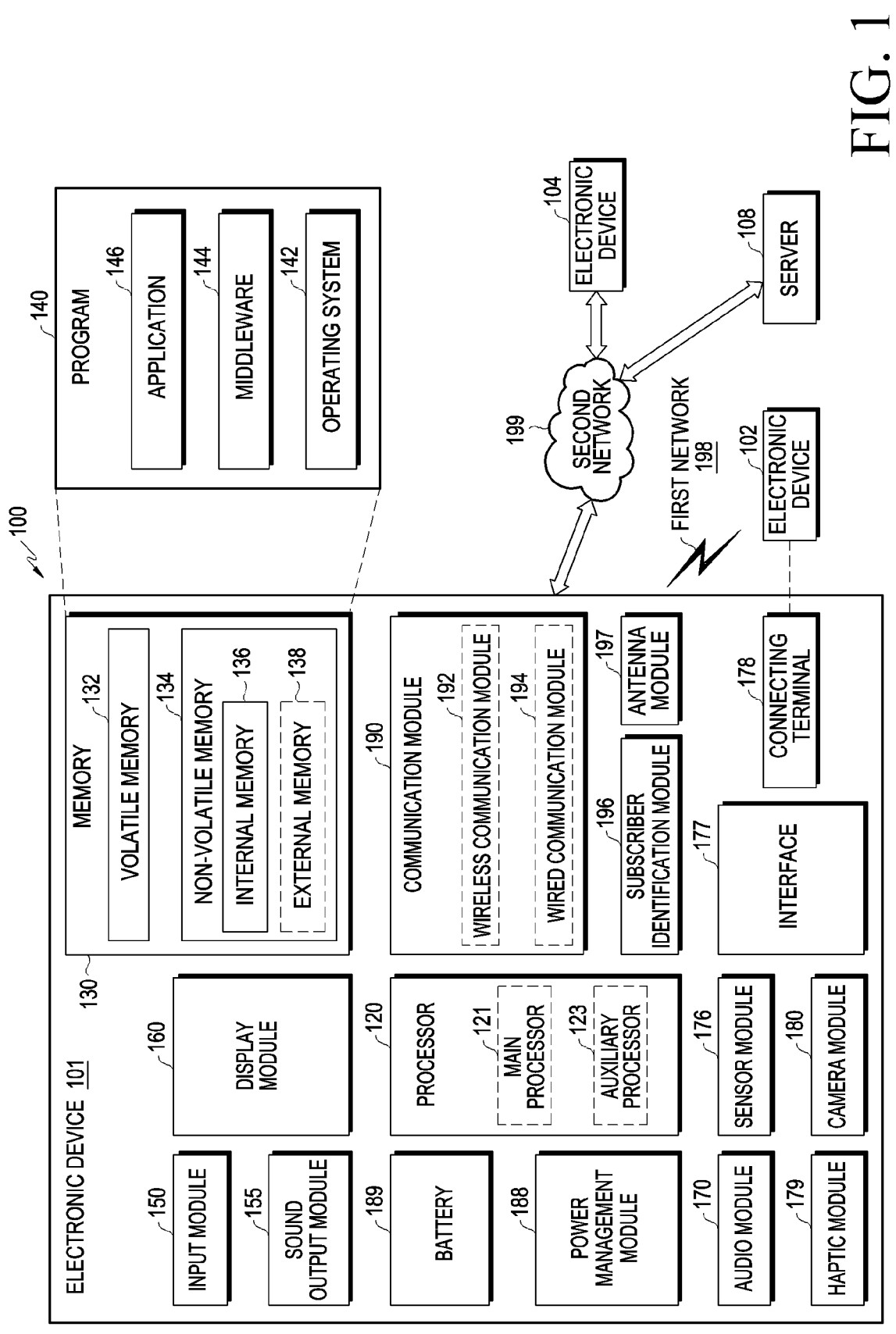
FIG. 1 is a block diagram illustrating an electronic device in a network environment according to an embodiment.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna.

The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
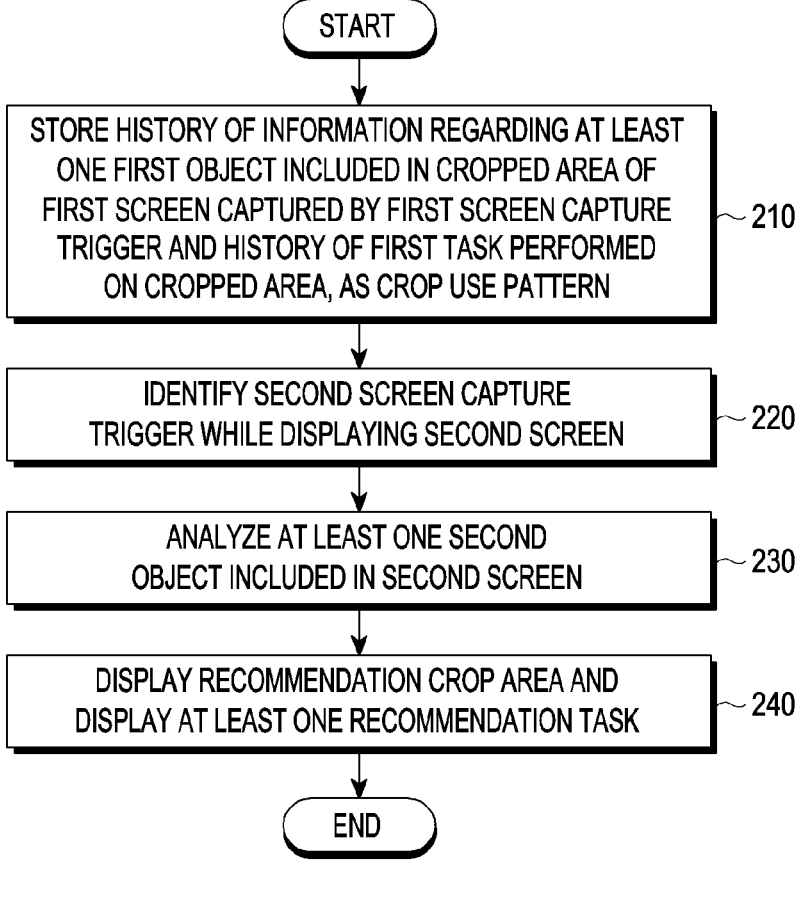
FIG. 2 is a flowchart illustrating operations performed in an electronic device according to an embodiment.

FIG. 2 is a flowchart illustrating example operations performed in an electronic device according to an embodiment.

At least one processor (e.g., the processor 120) of an electronic device (e.g., the electronic device 101) may capture a first screen in response to generation of a first screen capture trigger while displaying a first screen on a display (e.g., the display module 160). The screen capture trigger may refer, for example, to an input for capturing the screen. For example, the screen capture trigger may include at least one of pressing a specific physical button on the electronic device 101 or a screen capture command on a screen capture application. Thereafter, the at least one processor 120 may crop a partial area of the first screen according to a user input and perform a first task on the cropped area.

In operation 210, the at least one processor 120 may store a history of information regarding at least one first object included in the cropped area of the first screen captured by the first screen capture trigger and a history of the first task performed on the cropped area, as a crop use pattern.

According to an embodiment, the information regarding the at least one first object may correspond to the first task and be stored as the crop use pattern. In other words, the crop use pattern may include information regarding the at least one first object which is the cropped area and the first task performed on the cropped area. According to an embodiment, when screen capture, crop, and subsequent task are performed several times on the electronic device 101, the crop use pattern may include a plurality of first object information-first task pairs.

According to an embodiment, the information regarding the at least one first object may include attributes of the at least one first object. According to an embodiment, the object may have text, image, video, map, graph, or other attributes. According to an embodiment, the text attributes may be further divided into sub attributes, such as plain text, title, text link, time, date, label, or color custom text. According to an embodiment, among image-type objects, an object having a preset shape may be defined as a configuration component. For example, the configuration component may be classified as on/off switch, checkbox, button, spinner, dropdown list, slider, and text input field. According to an embodiment, the other attributes may further be divided into table, ticket, receipt, QR code, or barcode.

According to an embodiment, the information regarding the at least one first object may further include information about the first application corresponding to the screen where the at least one first object has been displayed, e.g., first screen.

According to an embodiment, the crop use pattern may further include context information about the electronic device 101 when the first task is performed. The context information about the electronic device 101 may include at least one of the time when the first task is performed, the location of the electronic device 101, the direction of the electronic device 101, or the movement of the electronic device 101. For example, the context information about the electronic device 101 may indicate that the time when the first task is performed is a late night time, and the location of the electronic device 101 when the first task is performed is the location registered as the user's home. In another example, the context information about the electronic device 101 may indicate that the time when the first task is performed is a commute time, and the electronic device 101 was moving when the first task is performed.

Figure 3A:
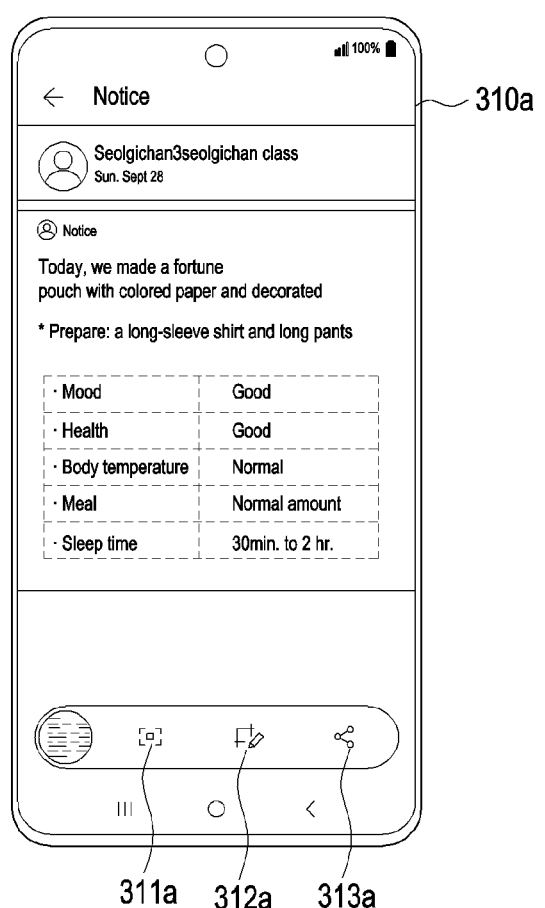
FIGS. 3A, 3B, 3C, 3D, and 3E are diagrams illustrating example screens displayed on an electronic device according to an embodiment.

FIG. 3A is a diagram illustrating an example screen displayed on the display 160 in response to generation of a first screen capture trigger according to an embodiment. Referring to FIG. 3A, in response to generation of the first screen capture trigger, the at least one processor 120 may capture and display the first screen 310a on the display 160 and display an input interface 311a for storing the entire first screen 310a, an input interface 312a for cropping a portion of the first screen 310a, and an input interface 313a for sharing the entire first screen 310a.

Figure 3B:
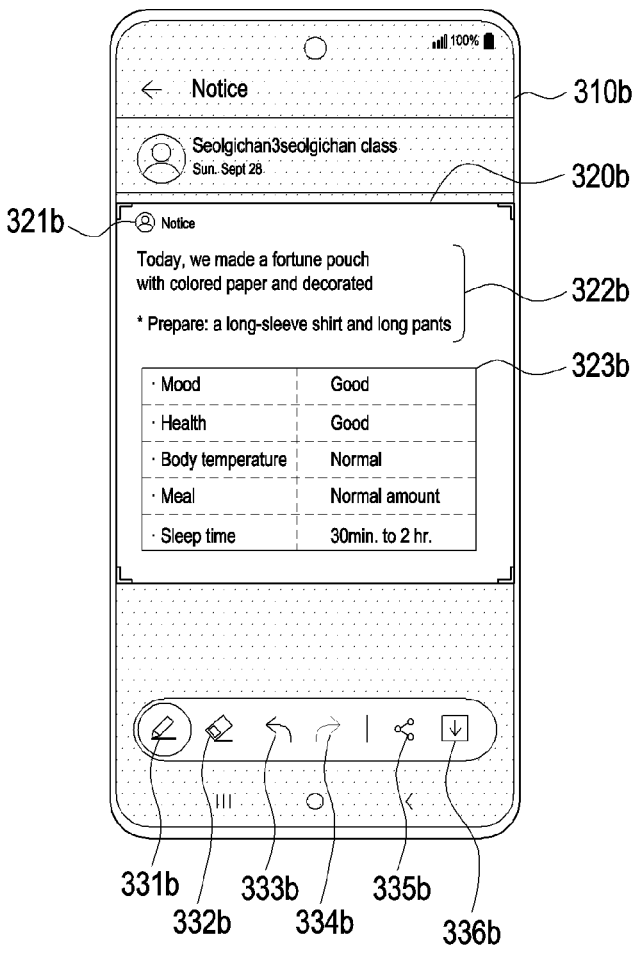

FIG. 3B is a diagram illustrating an example screen displayed on the display 160 when selecting the input interface 312a for cropping a portion of the first screen 310a in FIG. 3A according to an embodiment. Referring to FIG. 3B, the selection area 320b designated by the user, of the first screen 310b, may be displayed, visually separated from the remaining area of the first screen 310b. According to an embodiment, the at least one processor 120 may display, on the display 160, a handwriting interface 331b, an eraser input interface 332b, a go-back interface 333b, a go-forward interface 334b, an interface 335b for sharing the selection area 320b, and an interface 336b for storing the selection area 320b.

According to an embodiment, when the interface 335b for the user to share the selection area 320b or the interface 336b for storing the selection area 320b is selected, the at least one processor 120 may identify information regarding objects included in the selection area 320b. The at least one processor 120 may identify that a title object 321b, a text object 322b, and a table object 323b are present in the selection area 320b.

If a subsequent task is performed on the selection area 320b, the at least one processor 120 may store information regarding the objects 321b, 322b, and 323b included in the selection area 320b, in association with the subsequent task, in the memory 130. For example, the subsequent task may be the operation of transmitting the selection area 320b, in an image form, to the husband through a message application. In this case, the at least one processor 120 may associate a combination of the title object 321b, the text object 322b, and the table object 323b with the operation of transmitting the selection area 320b in the image form to the husband through the message application and store them, as a crop use pattern, in the memory 130.

According to an embodiment, the at least one processor 120 may associate a combination of the title object 321b, the text object 322b, and the table object 323b and an application name related to the selection area 320b with the operation of transmitting the selection area 320b in the image form to the husband through the message application and store them, as a crop use pattern, in the memory 130.

In operation 220, the at least one processor 120 may identify a second screen capture trigger while a second screen is displayed on the display 160.

In operation 230, the at least one processor 120 may analyze at least one second object included in the second screen in response to the second screen capture trigger. The at least one processor 120 may identify information regarding the at least one second object included in the second screen by referring to the application corresponding to the second screen. Various examples that the information regarding the at least one second object may have are the same as or similar to those described in connection with the information regarding the at least one first object with reference to operation 210.

In operation 240, the at least one processor 120 may display a recommendation crop area on the display 160 and display at least one recommendation task based on a result of analysis of the at least one second object and the crop use pattern. According to an embodiment, the at least one processor 120 may contrast the result of analysis of the at least one second object with the information regarding the at least one first object included in the crop use pattern and display the area including at least one third object best matching the at least one first object included in the crop use pattern among the at least one second object, as the recommendation crop area. Best matching may refer, for example, to the number of times at which the first task has been performed on the at least one first object being the largest. Or, best matching may refer, for example, to the frequency at which the first task has been performed on the at least one first object being the highest. Or, best matching may refer, for example, to the number of times at which the first task has been performed on the at least one first object during a predetermined (e.g., specified) latest period being the largest.

According to an embodiment, the at least one processor 120 may display the recommendation crop area visually differently from the remaining area on the second screen.

According to an embodiment, the at least one processor 120 may display the first task corresponding to the at least one first object best matching at least one third object among the first tasks included in the crop use pattern, as a recommendation task. The best matching has been described above.

Figure 3C:
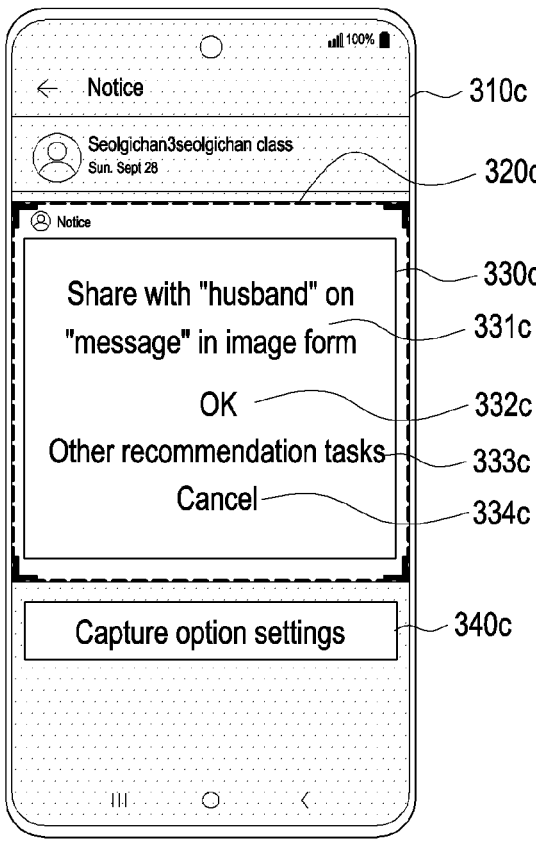

FIG. 3C is a diagram illustrating an example of the screen 310c where the recommendation crop area and recommendation task are displayed, in response to generation of a second screen capture trigger when the second screen is displayed according to an embodiment. Referring to FIG. 3C, the second screen includes a title object, a text object, and a table object, which are identical (or similar) in attribute to the title object 321b, text object 322b, and table object 323b of FIG. 3B. As a result, the at least one processor 120 may display the area including the title object, text object, and table object, as the recommendation crop area 320c, differently from the remaining portions of the second screen.

The at least one processor 120 may display a recommendation task 331c based on a history of the first task performed on a selection area 320b including the title object 321b, text object 322b, and table object 323b of FIG. 3B. Referring to FIG. 3C, the recommendation task 331c may be displayed in the form of a popup message 330c, but the display form is not limited. When the user selects an OK menu item 332c, the at least one processor 120 may perform the recommendation task 331c on the recommendation crop area 320c. When the user selects an other recommendation task menu item 333c, the at least one processor 120 may further display an alternative recommendation task 331c. When the user selects a cancel menu item 334c, the at least one processor 120 may stop providing the recommendation task and stop displaying the popup message 330c. When the user selects a capture option settings menu item 340c, the at least one processor 120 may display an interface for the user herself to set the option. According to an embodiment, the option for capture may include a file format to store the object included in the area to be cropped.

Figure 3D:
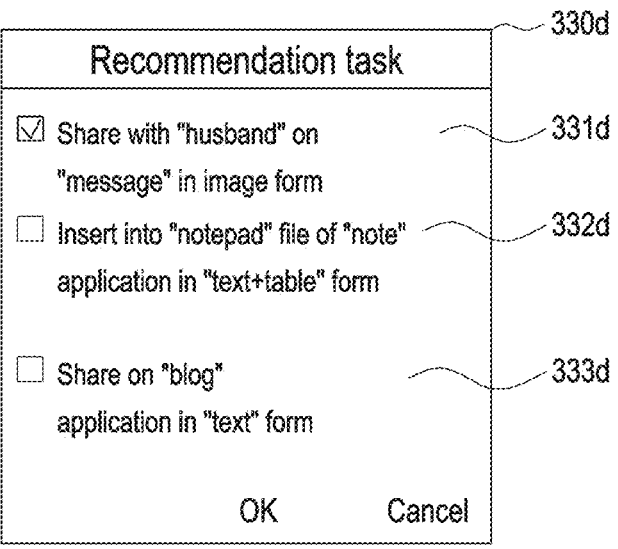

FIG. 3D is a diagram illustrating an example graphic interface 330d that may be displayed on the display when the user selects the other recommendation task menu item 333c while the screen of FIG. 3C is displayed according to an embodiment. According to an embodiment, the graphic interface 333d may be displayed in addition to the popup message 330c of FIG. 3C, to at least partially overlap over the popup message 330c of FIG. 3C, or instead of the popup message 330c of FIG. 3C.

According to an embodiment, a plurality of recommendation tasks 331d, 332d, and 333d may be displayed on the graphic interface 330d. According to an embodiment, the plurality of recommendation tasks 331d, 332d, and 333d may be first tasks corresponding to at least one first object matching at least one third object, e.g., the title object, text object, and table object, among the first tasks included in the crop use pattern, and the order of displaying the plurality of recommendation tasks 331d, 332d, and 333d may be determined based on the frequency and/or number of times at which the task is performed.

Figure 3E:
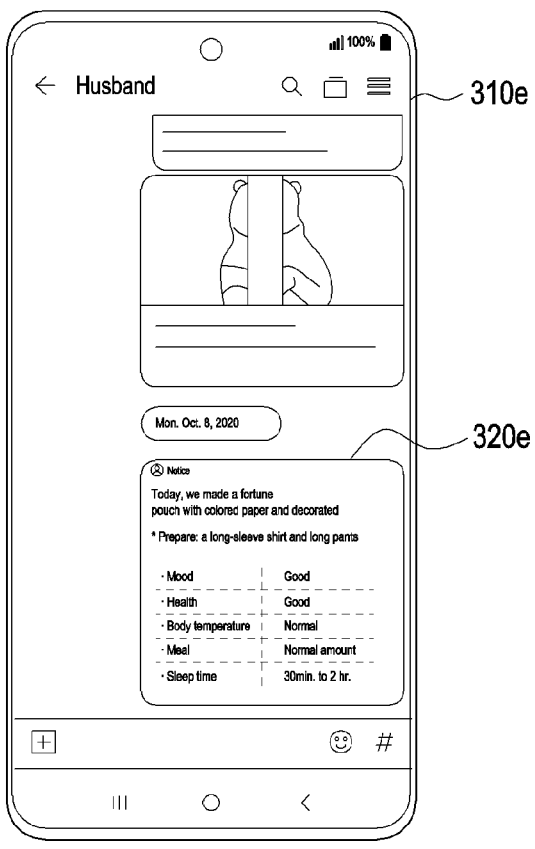

FIG. 3E is a diagram illustrating an example screen 310e that may be displayed on the display when the user selects the OK menu item 332c while the screen of FIG. 3C is displayed. When the user selects the OK menu item 332c while the screen of FIG. 3C is displayed, the at least one processor 120 may execute a message application, obtain the image 320e corresponding to the recommendation crop area 320c, and transmit the obtained image 320e to the husband through the message application. The resultantly displayed screen 310e is an execution screen of the message application, and the image 320e corresponding to the recommendation crop area 320c may be included in the screen 310e.

Figure 4A:
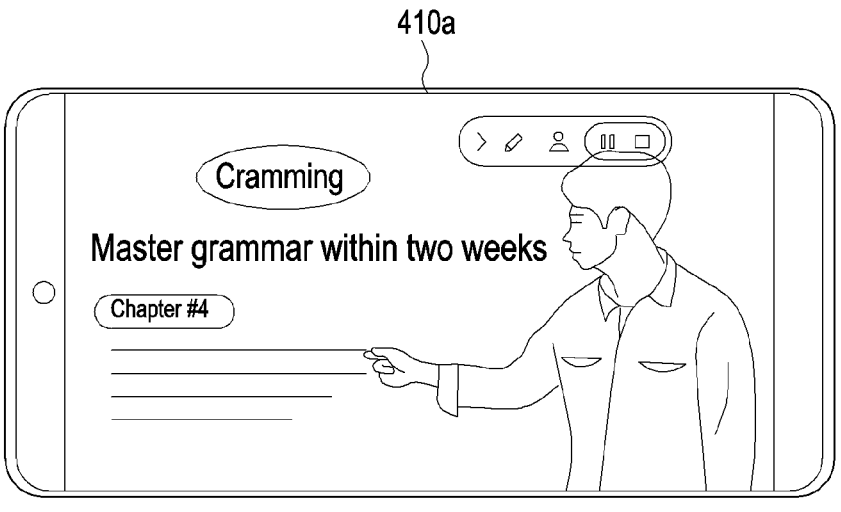
FIGS. 4A and 4B are diagrams illustrating example screens displayed on an electronic device according to an embodiment.
Figure 4B:
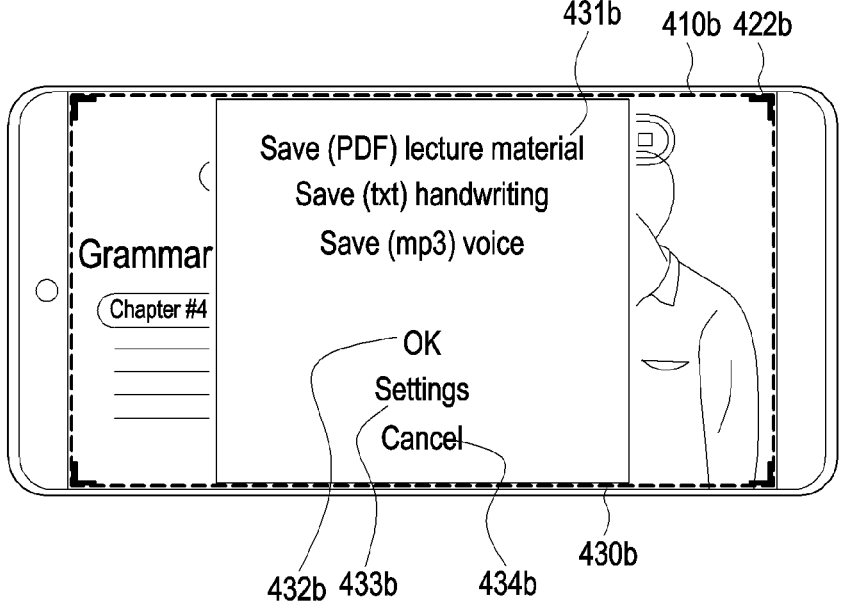

FIGS. 4A and 4B are diagrams illustrating example screens displayed on an electronic device according to an embodiment. According to an embodiment, the at least one first object described in connection with operation 210 of FIG. 2 may include a first video. A first screen capture trigger may be generated while the first screen including the first video is displayed. The at least one processor 120 of the electronic device 101 may perform the operation of storing content of a first setting related to the first video according to the subsequent inputs and the first screen capture trigger according to the user's input, as the first task. As described above in connection with operation 210 of FIG. 2, the at least one processor 120 may associate information regarding the at least one first object with the first task and store them, as a crop use pattern, in the memory 130.

The content of the first setting may be content related to the first video, configured according to the user's input subsequent to the first screen capture trigger. According to an embodiment, the user may configure to obtain at least one of a video file recording the first video, an image file of visual content related to the first video, a PDF file of visual content included in the first video, a voice file related to the first video, a text file corresponding to the voice file, or a text file related to the first video, through the input subsequent to the first screen capture trigger. The content specified by the user's setting may be referred to as the content of the first setting.

According to an embodiment, when the first video is a lecture video, the visual content included in the first video may be lecture material displayed as the background in the first video. The at least one processor 120 may detect when the lecture material is switched on the screen through image analysis for the first video, and store the lecture material in image or PDF format whenever the lecture material is switched.

According to an embodiment, the voice file related to the first video may be a voice file obtained by extracting the voice of a person designated by the user among several persons when the first video includes the voices of the several persons. According to an embodiment, when the visual content included in the first video and the voice file related to the first video both are configured to be stored, the at least one processor 120 may create voice files segmented with reference to the switch of the visual content, map the respective voice files with the corresponding visual content, and store them.

According to an embodiment, the text file corresponding to the voice file may include text in which the voices of the several persons are displayed separately in different colors, respectively, when the first video includes the voices of the several persons. According to an embodiment, when both the visual content included in the first video and the text file corresponding to the voice file are configured to be stored, the at least one processor 120 may create text files segmented with reference to the switch of the visual content, map the respective text files to the corresponding visual content, and store them.

According to an embodiment, the text file related to the first video may include text corresponding to at least one of the handwriting made by the user while the first video is played back or a handwriting provided in the first video. According to an embodiment, when both the visual content included in the first video and the text file corresponding to the voice file are configured to be stored, the at least one processor 120 may create text files segmented with reference to the switch of the visual content, map the respective text files to the corresponding visual content, and store them.

FIG. 4A illustrates a second screen where a second video 410a is displayed before the second screen capture trigger is generated. When the second screen capture trigger is generated on the second screen shown in FIG. 4A, the at least one processor 120 may analyze the object included in the second screen and display the operation of storing the content of the first setting in relation to the second video 410a included in the second screen based on the crop use pattern and the analysis result, as a recommendation task.

FIG. 4B illustrates the second screen 410b displaying the recommendation task 431b and the recommendation crop area 422b. Referring to FIG. 4B, the recommendation task 431b may be displayed in the form of a popup message 430b but, according to an embodiment, the display form of the recommendation task is not limited. The recommendation task 431b may store the lecture material related to the second video 410a in the form of a PDF file, store the handwriting in the form of a text file, and store the voice corresponding to the lecture material in the form of an mp3 file.

When the user selects the ok menu item 432b, the at least one processor 120 may perform the recommendation task 431b. When the user selects the settings menu item 433b, the at least one processor 120 may display an interface for receiving the content of the second setting to be stored in relation to the second video 410a. When the user selects the cancel menu item 434b, the at least one processor 120 may stop the capture of the second video 410a, the display of the recommendation crop area 422b, and the display of the popup message 430b.

Figure 5A:
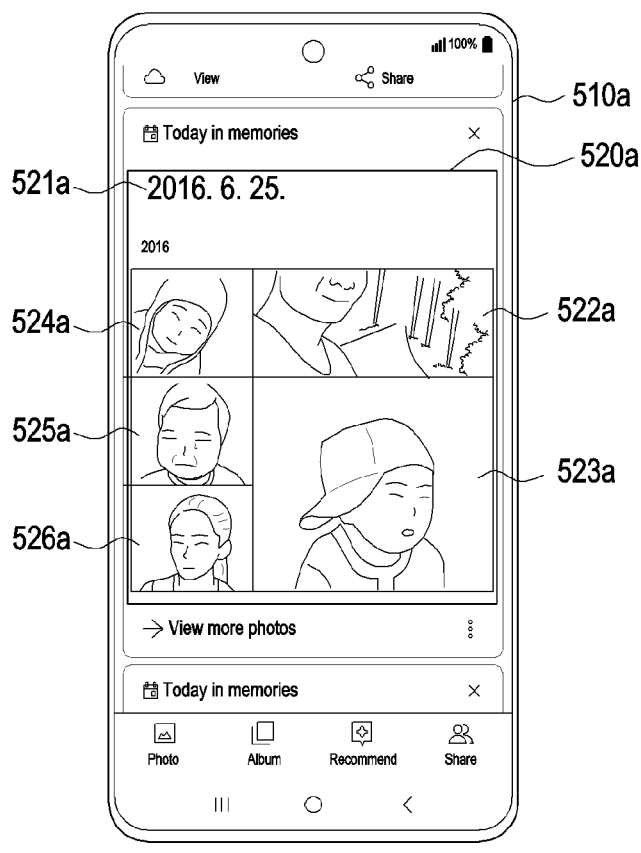
FIGS. 5A, 5B, 5C, and 5D are diagrams illustrating example screens displayed on an electronic device according to an embodiment.

FIGS. 5A, 5B, 5C and 5D are diagrams illustrating example screens displayed on an electronic device according to an embodiment. FIG. 5A illustrates a first screen 510a according to an embodiment. According to an embodiment, when the at least one processor 120 of the electronic device 101 performs operation 210 of FIG. 2, at least one first object in the cropped area 520a may include a date object 521a and at least one image 522a, 523a, 524a, 525a, and 526a. According to an embodiment, the at least one processor 120 may perform image analysis on the at least one image 522a, 523a, 524a, 525a, and 526a included in the cropped area 520a and store information regarding the at least one image 522*a*, 523*a*, 524*a*, 525*a*, and 526*a*, as information about the at least one image 522*a*, 523*a*, 524*a*, 525*a*, and 526*a*, as part of the crop use pattern, based on the image analysis. According to an embodiment, the image analysis on the at least one image 522*a*, 523*a*, 524*a*, 525*a*, and 526*a* may include facial recognition on the subject included in the image. In other words, the at least one processor 120 may store information indicating that the first task has been performed on the image including the specific subject, as well as information indicating that the first task has been performed on the image-type object, as part of the crop use pattern, in the memory 130.

Figure 5B:
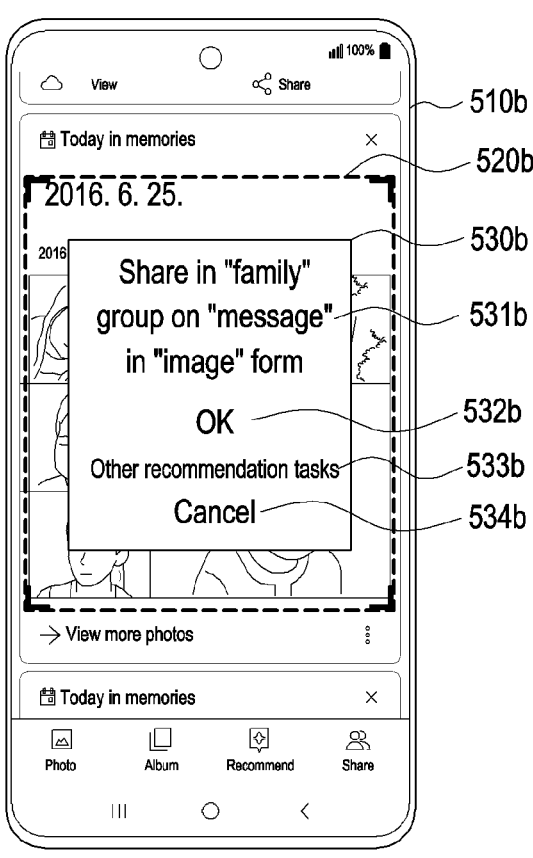

FIG. 5B is a diagram illustrating an example screen 510*b* displayed on the display 160 when the at least one processor 120 performs operation 240 of FIG. 2. Referring to FIG. 5B, a date object and at least one image may be included in the second screen. The at least one processor 120 may identify that the second screen includes the date object and at least one image as a result of analysis on the second screen. Further, the at least one processor 120 may identify the operation of allowing the image corresponding to the area including the date object and at least one image by contrasting the crop use pattern and the analysis result on the second screen, to be shared in the family group, as the recommendation task. Referring to FIG. 5B, the recommendation crop area 520*b* may include the date object and at least one image. Referring to FIG. 5B, the recommendation task 531*b* may be displayed in the form of a popup message 530*b* but, according to an embodiment, the display form of the recommendation task is not limited. According to an embodiment, the recommendation task 531*b* may be the operation of sharing the image corresponding to the recommendation crop area 520*b* in the family group through the message application.

When the user selects the ok menu item 532*b*, the at least one processor 120 may perform the recommendation task 531*b* on the recommendation crop area 520*b*. When the user selects an other recommendation task menu item 533*b*, the at least one processor 120 may further display an alternative recommendation task. When the user selects a cancel menu item 534*b*, the at least one processor 120 may stop providing the recommendation task and stop displaying the popup message 530*b*.

Figure 5C:
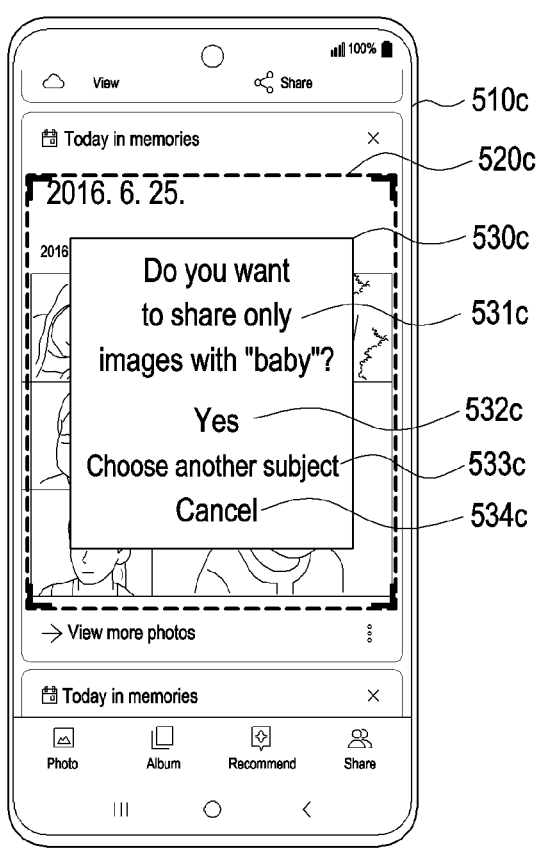

FIG. 5C is a diagram illustrating an example screen 510*c* that may be displayed when the user selects the ok menu item 532*b* when the screen 510*b* of FIG. 5B is shown according to an embodiment. According to an embodiment, when the user selects the ok menu item 532*b* when the screen 510*b* of FIG. 5B is shown, the at least one processor 120 may prompt the user as to whether to select and share only images including the specific subject among the at least one image included in the recommendation crop area 520*b* based on the crop use pattern before performing the recommendation task 531*b*. According to an embodiment, the crop use pattern may indicate that the frequency and/or number of times at which images including a baby and images corresponding to the area included in the date object are shared in the family group through the message application is a predetermined level or more. Referring to FIG. 5C, the at least one processor 120 may display a message 531*c*, which prompts whether to select and share only images including a baby among the at least one image included in the recommendation crop area 520*c*, in the form of a popup message 530*c*.

Figure 5D:
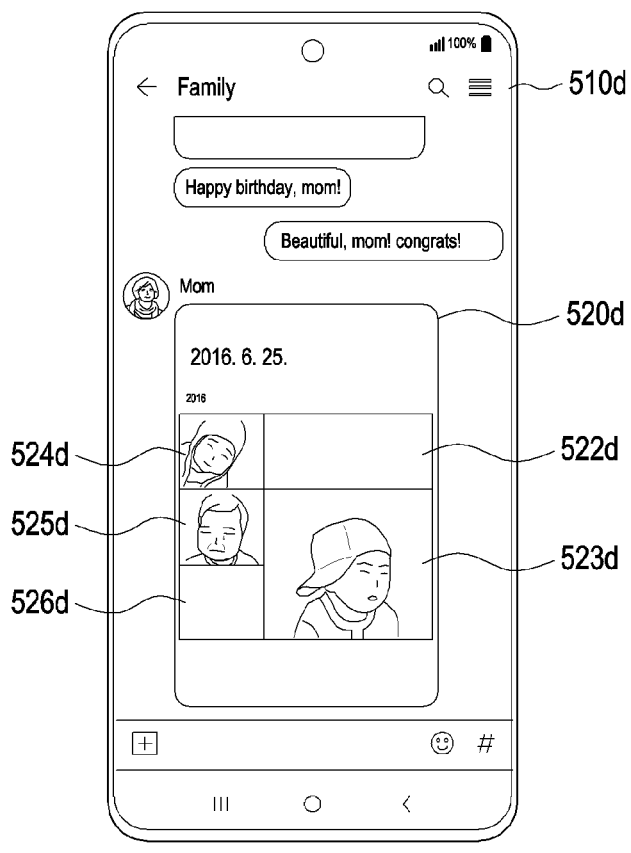

When the user selects the ok menu item 532*c*, the at least one processor may obtain the image corresponding to the recommendation crop area 520*c*, edit images obtained so that other images than the images including the baby among the at least one image included in the recommendation crop area 520*c* are hidden, and transmit the edited images to the family group through the message application. In this case, an execution screen 510*d* of the message application is shown in FIG. 5D. Referring to FIG. 5D, it may be identified that in response to selection of the ok menu item 532*c* by the user, the image 520*d* corresponding to the recommendation crop area 520*c* may be transmitted, but the images 522*a*, 523*a*, 524*a*, 525*a*, and 526*a* included in the recommendation crop area 520*c* have been edited so that the images 522*d* and 526*d* not including the baby are hidden.

When the user selects an other subject selection menu 533*c*, the at least one processor 120 may further display at least one image including the other subject. When the user selects a cancel menu item 534*c*, the at least one processor 120 may stop providing the recommendation crop area and stop displaying the popup message 530*c*.

Figure 6A:
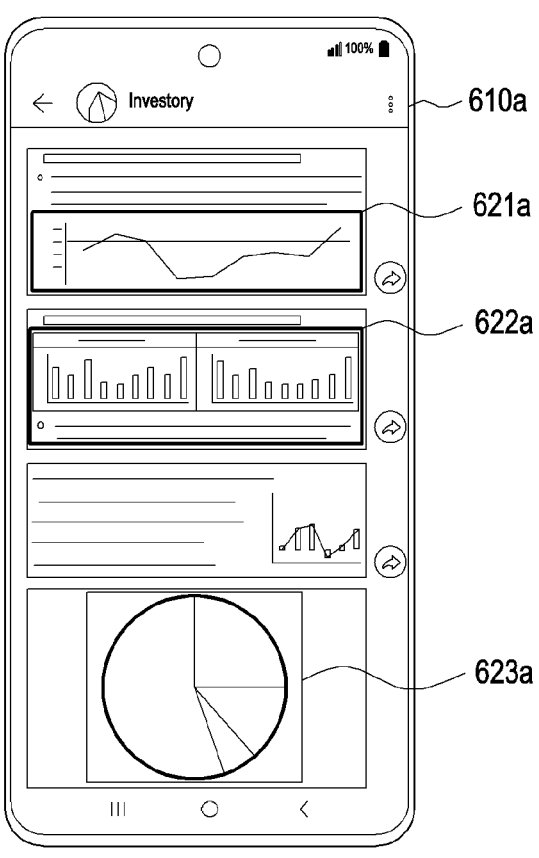
FIGS. 6A, 6B, and 6C are diagrams illustrating example screens displayed on an electronic device according to an embodiment.
Figure 6B:
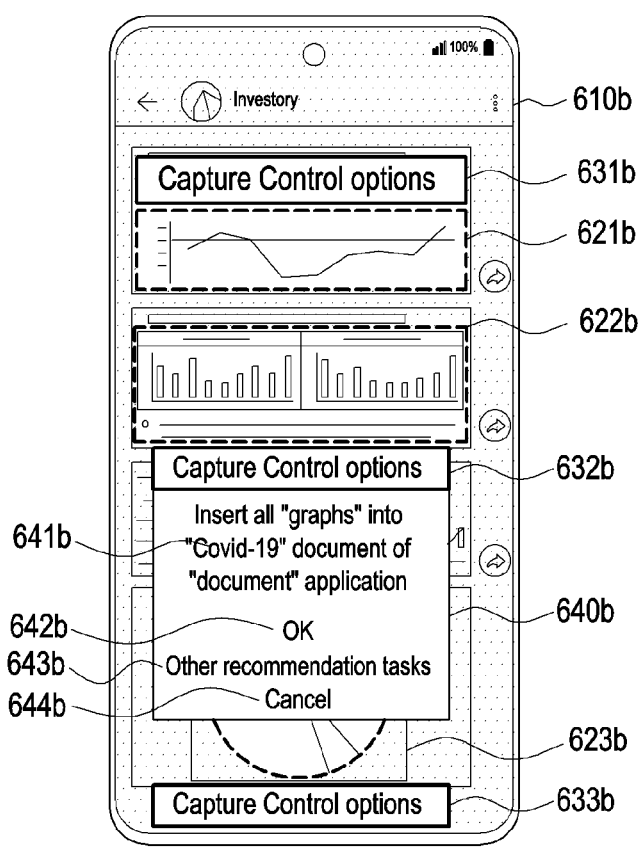
Figure 6C:
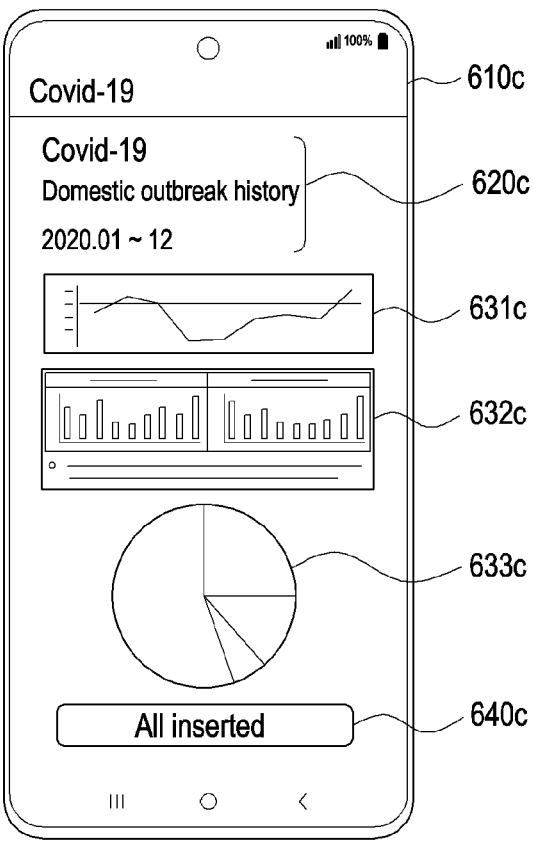

FIGS. 6A, 6B and 6C are diagrams illustrating example screens displayed on an electronic device according to an embodiment. FIG. 6A illustrates a first screen 610*a* according to an embodiment. According to an embodiment, when the at least one processor 120 of the electronic device 101 performs operation 210 of FIG. 2, a plurality of areas 621*a*, 622*a*, and 623*a* may be cropped, and the plurality of areas respectively may include graph objects. According to an embodiment, the crop use pattern stored by the at least one processor 120 may include the fact that the objects included in the plurality of cropped areas 621*a*, 622*a*, and 623*a* are graph objects, the fact that the first screen 610*a* is an execution screen of an application included in a predefined (e.g., specified) application group, and a first task performed on the plurality of cropped areas 621*a*, 622*a*, and 623*a*. According to an embodiment, the predefined application group may include productivity applications.

FIG. 6B illustrates a screen 610*b* displayed on the display 160 when the at least one processor 120 performs operation 240 of FIG. 2. Referring to FIG. 6B, the at least one processor 120 may be an execution screen of an application included in the predefined application group. The at least one processor 120 may identify that the second screen includes a plurality of graph objects 621*b*, 622*b*, and 623*b* as a result of analysis of the second screen. The at least one processor 120 may identify a plurality of areas respectively corresponding to the plurality of graph objects 621*b*, 622*b*, and 623*b* as recommendation crop areas based on the crop use pattern. According to an embodiment, the at least one processor 120 may further display interfaces 631*b*, 632*b*, and 633*b* for option settings for the respective recommendation crop areas on the screen 610*b*. According to an embodiment, the at least one processor 120 may display the recommendation task 641*b* based on the fact that the second screen is an execution screen of an application included in the predefined application group and the fact that the second screen includes a plurality of graph objects 621*b*, 622*b*, and 623*b*. Referring to FIG. 6B, the recommendation task 641*b* may be displayed in the form of a popup message 640*b* but, according to an embodiment, the display form of the recommendation task 641*b* is not limited. According to an embodiment, the recommendation task 641*b* may insert the plurality of graph objects 621*b*, 622*b*, and 623*b* included in the recommendation crop areas into a specific document of a document application.

When the user selects the ok menu item 642*b*, the at least one processor 120 may insert the plurality of graph objects 621*b*, 622*b*, and 623*b* included in the recommendation crop areas into a specific document of the document application. FIG. 6C illustrates a screen 610*c* that may be displayed when the user selects the ok menu item 642*b* when the screen 610*b* of FIG. 6B is shown according to an embodiment. Referring to FIG. 6C, in response to the user's selection of the ok menu item 642*b*, the at least one processor 120 may insert a plurality of graph objects 631*c*, 632*c*, and 633*c* into the existing draft 620*c* of the specific document of the document application and display them. According to an embodiment, the screen 610*c* may include an indication 640*c* that insertion of the plurality of objects has been completed.

When the user selects an other recommendation task menu item 643*b*, the at least one processor 120 may further display an alternative recommendation task. When the user selects the cancel menu item 644*b*, the at least one processor 120 may stop providing the recommendation task and stop displaying the popup message 640*b*.

Figure 7:
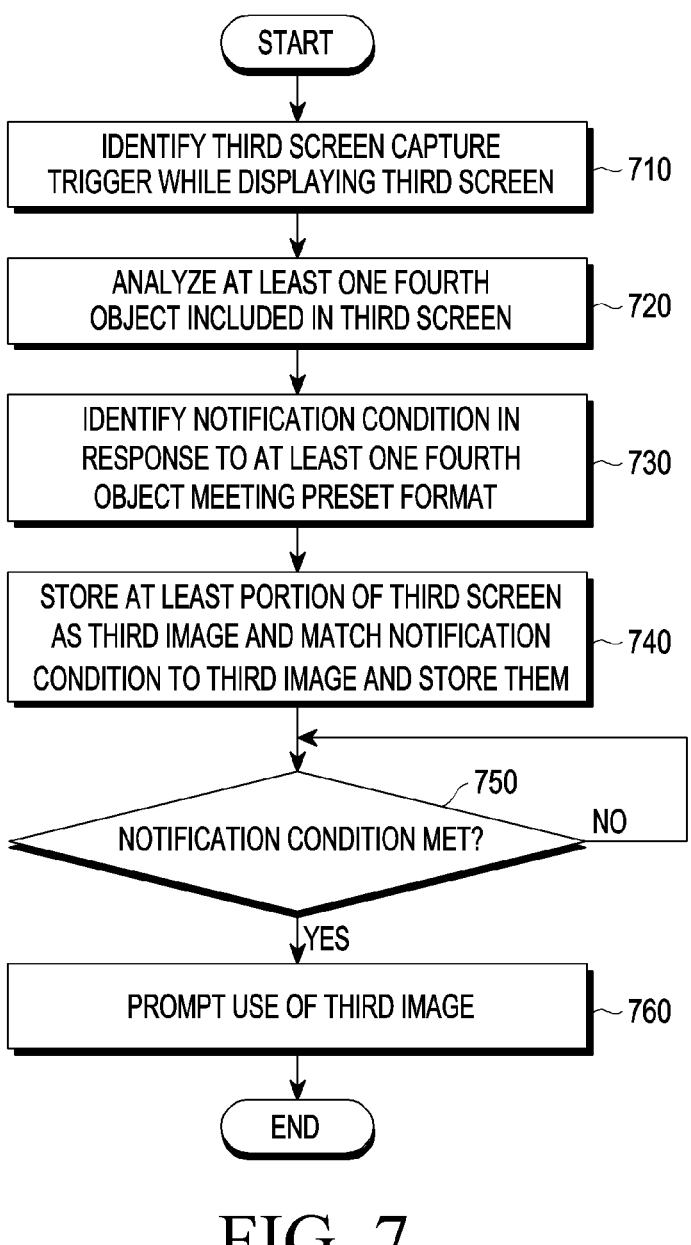
FIG. 7 is a flowchart illustrating example operations performed in an electronic device according to an embodiment.

FIG. 7 is a flowchart illustrating example operations performed in an electronic device according to an embodiment. The at least one processor (e.g., the processor 120) of the electronic device (e.g., the electronic device 101) may identify a third screen capture trigger while a third screen is displayed on the display (e.g., the display module 160) in operation 710.

In operation 720, the at least one processor 120 may analyze at least one fourth object included in the third screen.

In operation 730, the at least one processor 120 may identify a notification condition related to at least one fourth object included in the third screen in response to the at least one fourth object meeting a preset format. According to an embodiment, the preset format may be defined as a combination of objects having a specific attribute. For example, the preset format may include a ticket format including a barcode, an airline ticket format, and a membership proof format including a barcode.

According to an embodiment, the at least one processor 120 may store information regarding the preset format in the memory 130 and identify whether at least one fourth object included in the third screen meets the preset format by referring to the information. According to various embodiments, the at least one processor 120 may transmit a result of analysis on at least one fourth object included in the third screen to an external server (e.g., the server 108) storing information regarding the preset format and inquire the external server whether at least one fourth object included in the third screen meets the preset format, thereby identifying whether the at least one fourth object included in the third screen meets the preset format.

According to an embodiment, the notification condition may be met in the context where use of the capture image related to the at least one fourth object is appropriate. According to an embodiment, when the preset format includes the text object "expiration period" and the date object, the notification condition may be met when the remaining time to the date indicated by the date object is a preset period or less. In another example, when the preset format includes an object indicating a third party entity, the notification condition may be met when the electronic device 101 is located in the place related to the third party entity. In another example, when the preset format includes an airline ticket format, the notification condition may be met when a context related to an airline ticket is detected from a conversation on the message application.

In operation 740, the at least one processor 120 may store at least a portion of the third screen as a third image, match the notification condition with the third image, and store them in the memory (e.g., the memory 130). According to an embodiment, information about which object among the fourth objects matching the preset format is to be stored as the third image, together with the information about the preset format, may be stored in the memory 130 or the server 180. According to an embodiment, when the at least one processor 120 of the electronic device 101 inquires the external server whether the at least one fourth object included in the third screen meets the preset format, the external server may provide the electronic device 101 with information which object among the at least one fourth object should be stored as the third image as well as information indicating that the at least one fourth object meets the preset format.

In operation 750, the at least one processor 120 may identify whether the notification condition is met. The at least one processor 120 may repeat operation 750 until the notification condition is met.

Upon identifying that the notification condition is met in operation 750, the at least one processor 120 may prompt to use the third image in operation 760. According to an embodiment, use of the third image may include the operation of displaying the third image on the display 160. According to an embodiment, use of the third image may include the operation of transmitting the third image to another electronic device 101.

Figure 8A:
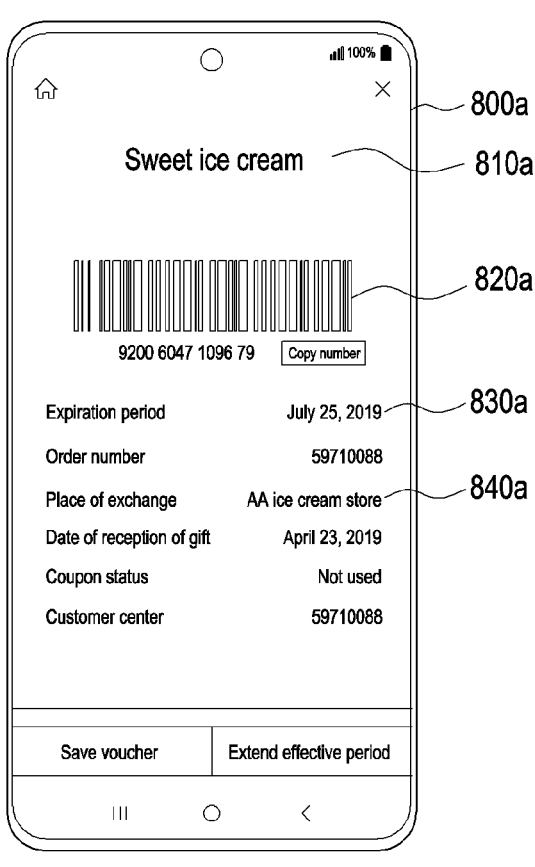
FIGS. 8A, 8B, and 8C are diagrams illustrating example screens displayed on an electronic device according to an embodiment.
Figure 8B:
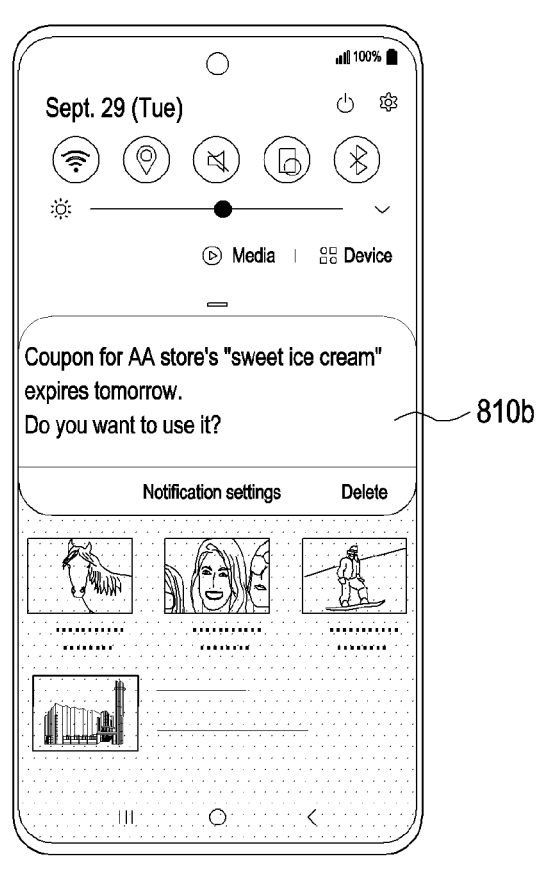
Figure 8C:
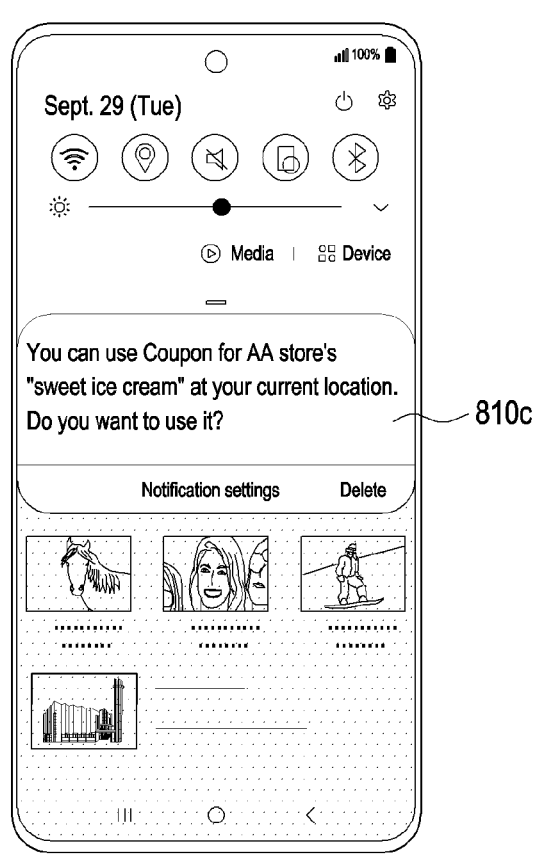

FIGS. 8A, 8B and 8C are diagrams illustrating example screens displayed on an electronic device according to an embodiment. FIG. 8A illustrates a screen 800*a* displaying at least one fourth object meeting a ticket format including a barcode. Referring to FIG. 8A, a product name 810*a*, a barcode 820*a*, an expiration date 830*a*, and a place of exchange 840*a* may be displayed on the screen 800*a*. The object attributes and positions of the product name 810*a*, the barcode 820*a*, the expiration date 830*a*, and the place of exchange 840*a* may meet the preset ticket format.

According to an embodiment, the notification condition may be met when the remaining time to the date indicated by the expiration period 830*a* is a preset period or less. In another example, the notification condition may be met when the electronic device 101 is located in a place related to the place of exchange 840*a*.

According to an embodiment, in operation 740, the at least one processor 120 may store at least some of the product name 810*a*, the barcode 820*a*, the expiration period 830*a*, and the place of exchange 840*a* as the third image.

FIG. 8B illustrates a screen displayed on the display 160 when the at least one processor 120 of the electronic device 101 performs operation 760 of FIG. 7 according to an embodiment. Referring to FIG. 8B, as the notification condition is met when the remaining time to the date indicated by the expiration period 830*a* is a preset period or less, a push notification 810*b* to prompt use of the third image may be displayed on the display 160. When the user selects the push notification 810*b*, the at least one processor 120 may display the third image on the display 160.

FIG. 8C illustrates a screen displayed on the display 160 when the at least one processor 120 of the electronic device 101 performs operation 760 of FIG. 7 according to an embodiment. Referring to FIG. 8C, as the notification condition is met when the electronic device 101 is located in the place related to the place of exchange 840*a*, a push notification 810*c* to prompt use of the third image may be displayed on the display 160. According to an embodiment, the at least one processor 120 may transmit location information about the electronic device 101 and place of exchange 840*a* information to a server (e.g., the server 108), and the server 108 may store one or more locations corresponding to the place of exchange 840*a*, identify whether the location of the electronic device 101 matches the location corresponding to the stored place of exchange 840*a* and, if matched, notify the at least one processor 120 of the electronic device 101 of it. When the user selects the push notification 810*c*, the at least one processor 120 may display the third image on the display 160.

Figure 9A:
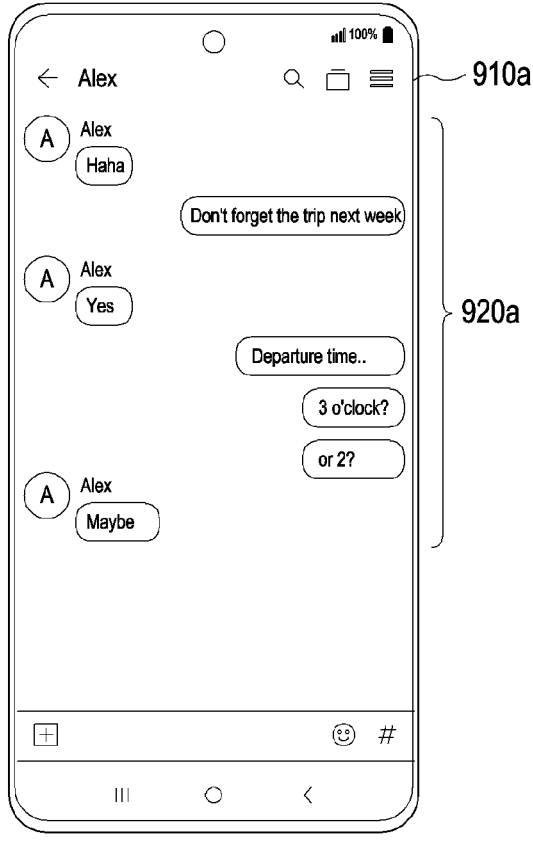
FIGS. 9A and 9B are diagrams illustrating example screens displayed on an electronic device according to an embodiment.
Figure 9B:
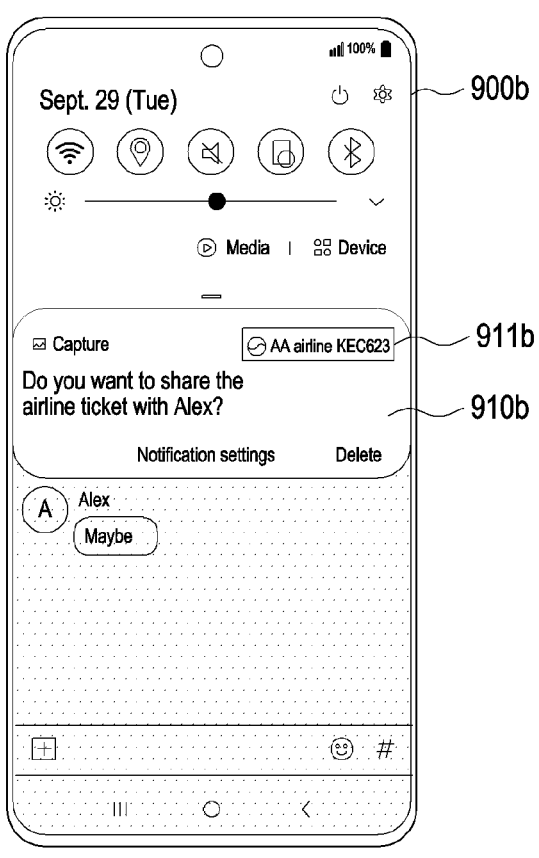

FIGS. 9A and 9B are diagrams illustrating example screens displayed on an electronic device according to an embodiment. According to an embodiment, in operation 730 of FIG. 7, the at least one processor 120 may identify whether at least one fourth object included in the third screen meets the airline ticket format and identify detection of a context related to the airline ticket in a conversation through the messaging application as the notification condition. FIG. 9A illustrates an execution screen 910*a* of the messaging application when the notification condition is met. According to an embodiment, the at least one processor 120 may analyze a conversation 920*a* through the messaging application and detect a context related to the airline ticket. According to an embodiment, the at least one processor 120 may transmit the conversation 920*a* through the messaging application and information regarding the airline ticket to an external server (e.g., the server 180) and receive a notification that the notification condition is met from the external server.

FIG. 9B illustrates a screen 900*b* displayed on the display 160 when the at least one processor 120 of the electronic device 101 performs operation 760 of FIG. 7 as the notification condition is met as in FIG. 9A. Referring to FIG. 9B, the at least one processor 120 may display a push notification 910*b* to prompt whether to share the captured image related to the airline ticket based on information about the other party of the conversation meeting the notification condition. According to an embodiment, a portion 911*b* of the captured image related to the airline ticket may be displayed on the push notification 910*b*. When the user selects the push notification 910*b*, the at least one processor 120 may transmit the captured third image related to the airline ticket to the other party of the conversation through the messaging application.

Figure 10A:
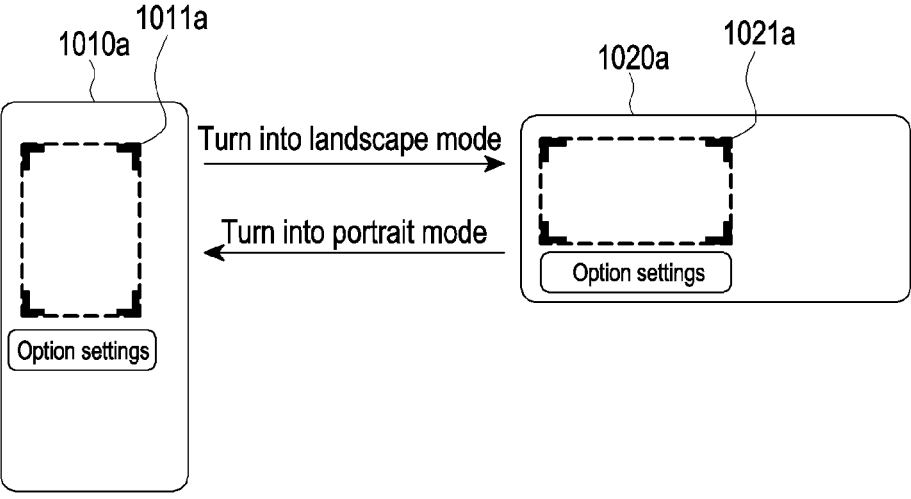
FIG. 10A is a diagram illustrating an example screen displaying a recommendation crop area according to the direction of an electronic device according to an embodiment.

FIG. 10A is a diagram illustrating an example screen displaying a recommendation crop area according to the direction of an electronic device according to an embodiment. According to an embodiment, while a recommendation crop area 1011*a* is displayed on the display of the electronic device 1010*a* in portrait mode, if the electronic device 101 turns into landscape mode, the overall size of the objects displayed on the electronic device 1020*a* in landscape mode may differ from that of the portrait mode. Accordingly, although the object corresponding to the recommendation crop area 1021*a* is identical (or similar) to the object corresponding to the recommendation crop area 1011*a*, the size of the recommendation crop area 1021*a* may differ from the size of the recommendation crop area 1011*a*. It will be appreciated by one of ordinary skill in the art that the same description is applied even where the electronic device 1020*a* in landscape mode turns into portrait mode.

Figure 10B:
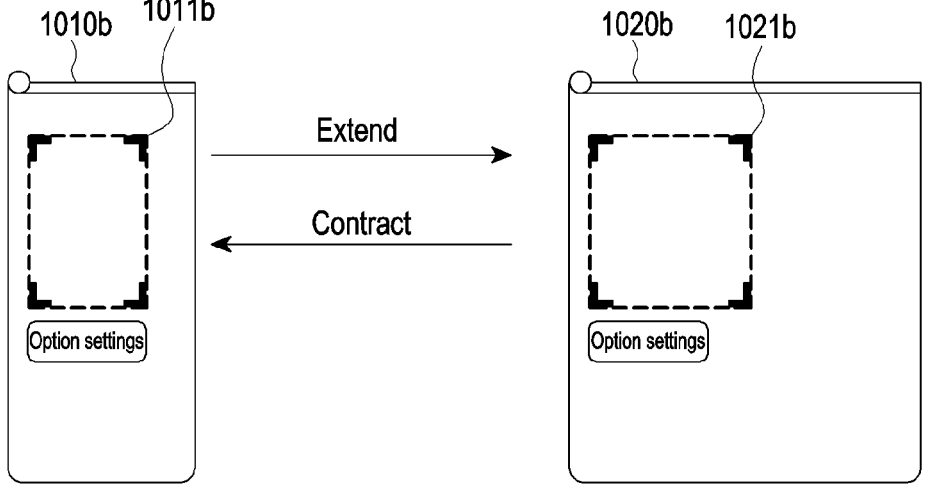
FIG. 10B is a diagram illustrating an example screen displaying a recommendation crop area according to enlargement or shrinkage of an electronic device according to an embodiment.

FIG. 10B is a diagram illustrating an example screen displaying a recommendation crop area according to enlargement or shrinkage of an electronic device according to an embodiment. According to an embodiment, while the recommendation crop area 1011*b* is displayed on the display of the electronic device 1010*b* in shrunken mode, if the housing of the electronic device extends, the overall size of the objects displayed on the extended electronic device 1020*b* may differ from that in the shrunken state. Accordingly, although the object corresponding to the recommendation crop area 1021*b* is identical (or similar) to the object corresponding to the recommendation crop area 1011*b*, the size of the recommendation crop area 1021*b* may differ from the size of the recommendation crop area 1011*b*. It will be appreciated by one of ordinary skill in the art that the same description is applied even where the housing of the extended electronic device 1020*b* is shrunken.

Figure 11A:
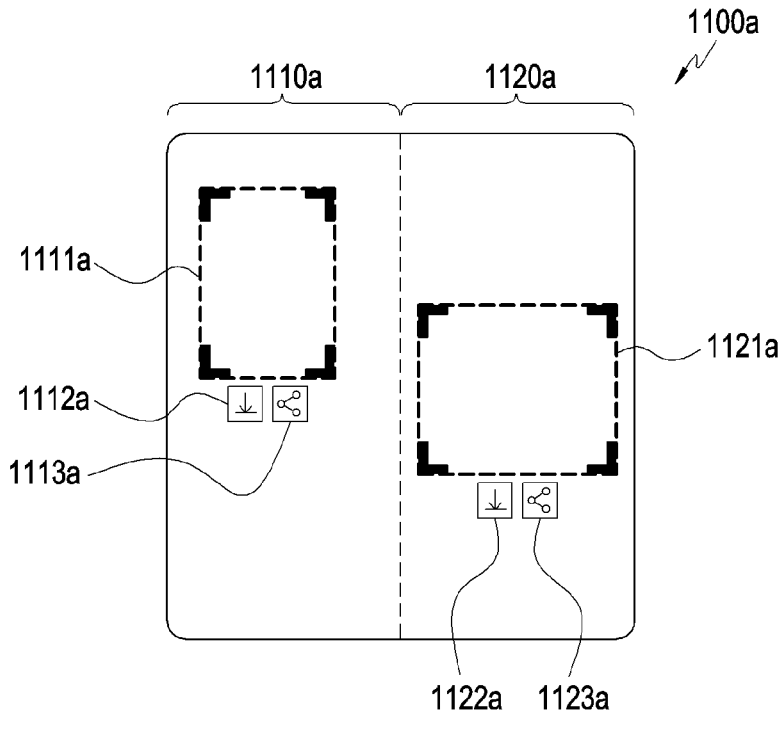
FIGS. 11A and 11B are diagrams illustrating example screens displayed on an electronic device according to an embodiment.
Figure 11B:
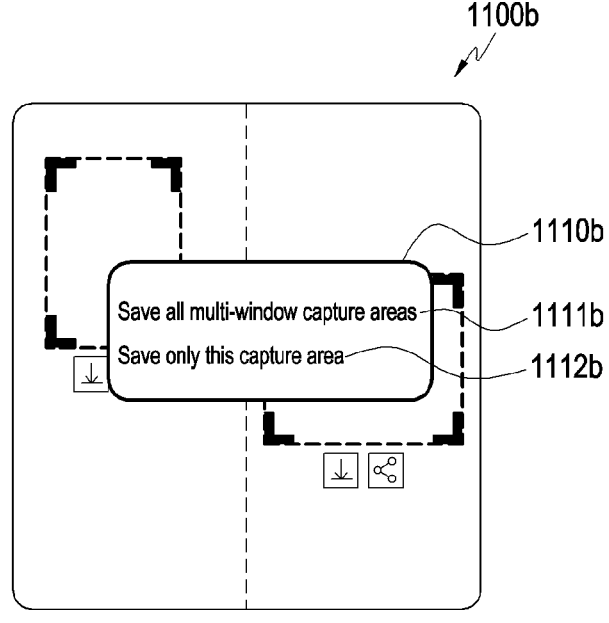

FIGS. 11A and 11B are diagrams illustrating example screens displayed on an electronic device according to an embodiment. FIG. 11A illustrates an example screen displaying a recommendation crop area in a multi-window context. Referring to FIG. 11A, an execution screen of a first application may be displayed in a first area 1110*a* of the entire area of the display 1100*a* of the electronic device, and an execution screen of a second application may be displayed in a second area 1120*a*. A first recommendation crop area 1111*a* may be displayed in the first area 1110*a*, and a user interface 1112*a* for storing the first recommendation crop area 1111*a* and a user interface 1113*a* for sharing the first recommendation crop area 1111*a* may be displayed. A second recommendation crop area 1121*a* may be displayed in the second area 1120*a*, and a user interface 1122*a* for storing the second recommendation crop area 1121*a* and a user interface 1123*a* for sharing the second recommendation crop area 1121*a* may be displayed.

FIG. 11B illustrates a screen 1100*b* displayed when the user selects the user interface 1112*a* for storing the first recommendation crop area 1111*a* or the user interface 1122*a* for storing the second recommendation crop area 1121*a* in the context where the screen of FIG. 11A is displayed. Referring to FIG. 11B, a popup message 1110*b* including a save all multi-window capture areas menu item 1111*b* and a save only the present capture area menu item 1112*b* may be displayed on the screen 1100*b*. When the user selects the save all multi-window capture areas menu item 1111*b*, the at least one processor of the electronic device may store both the first recommendation crop area 1111*a* and the second recommendation crop area 1121*a*. When the user selects the user interface 1112*a* for storing the first recommendation crop area 1111*a* so that the screen 1100*b* of FIG. 11B is displayed, and the user selects the save only the present capture area menu item 1112*b*, the at least one processor of the electronic device may store the first recommendation crop area 1111*a* and may not store the second recommendation crop area 1121*a*. When the user selects the user interface 1122*a* for storing the second recommendation crop area 1121*a* so that the screen 1100*b* of FIG. 11B is displayed, and the user selects the save only the present capture area menu item 1112*b*, the at least one processor of the electronic device may store the second recommendation crop area 1121*a* and may not store the first recommendation crop area 1111*a*.

Figure 12A:
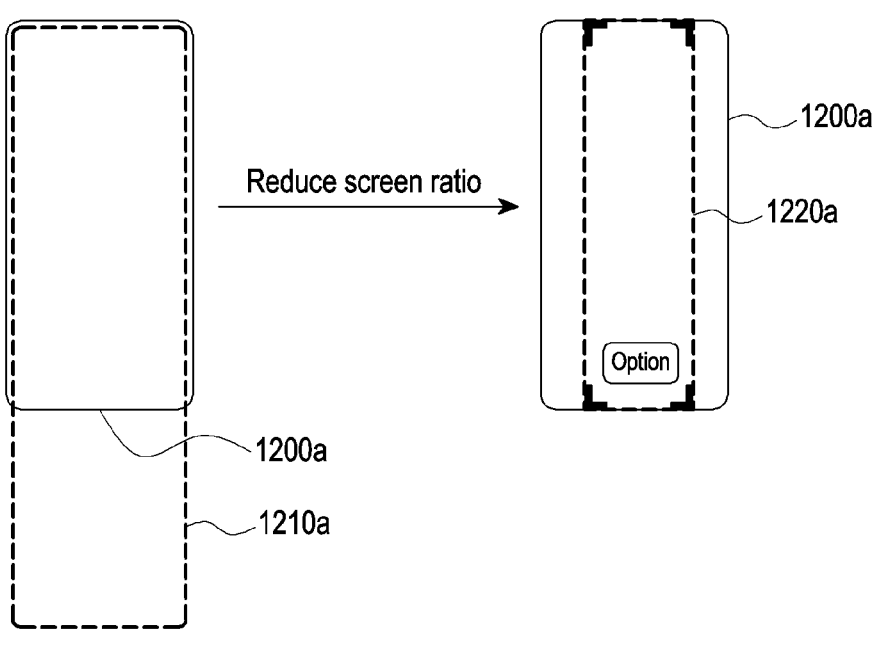
FIG. 12A is a diagram illustrating an example screen displaying a recommendation crop area according to an embodiment.

FIG. 12A is a diagram illustrating an example screen displaying a recommendation crop area according to an embodiment. When the vertical length of the recommendation crop area 1210*a* with reference to the screen currently displayed on the display 1200*a* is larger than the vertical length of the display 1200*a* of the electronic device 101, the at least one processor 120 of the electronic device 101 may reduce the overall ratio of the screen displayed on the display 1200*a* so that the vertical length of the recommendation crop area 1220*a* with reference to the shrunken screen is smaller than the vertical length of the display 1200*a*.

Figure 12B:
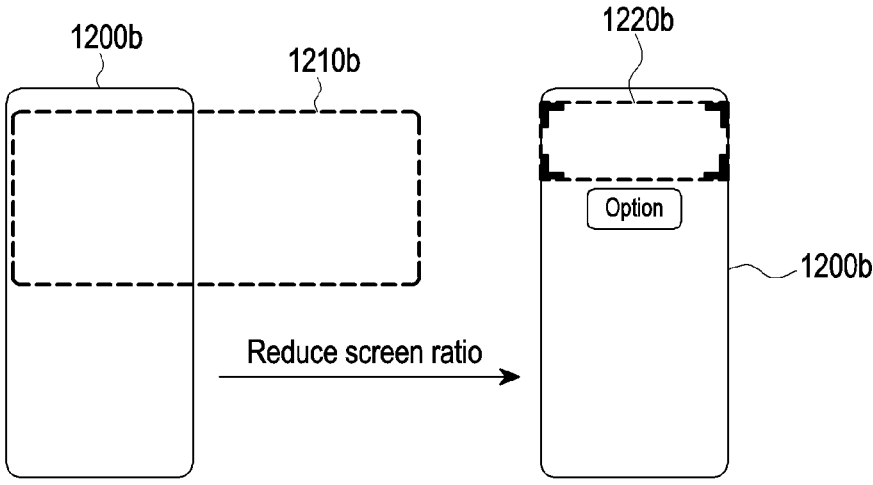
FIG. 12B is a diagram illustrating an example screen displaying a recommendation crop area according to an embodiment.

FIG. 12B is a diagram illustrating an example screen displaying a recommendation crop area according to an embodiment. When the horizontal length of the recommendation crop area 1210b with reference to the screen currently displayed on the display 1200b is larger than the horizontal length of the display 1200b of the electronic device 101, the at least one processor 120 of the electronic device 101 may reduce the overall ratio of the screen displayed on the display 1200b so that the horizontal length of the recommendation crop area 1220b with reference to the shrunken screen is smaller than the horizontal length of the display 1200b.

According to various example embodiments, an electronic device may comprise: a display, a memory, and at least one processor. The at least one processor may be configured to: store, in the memory, a history of information about at least one first object included in a cropped area of a first screen captured by a first screen capture trigger and a history of a first task performed on the cropped area as a crop use pattern, identify a second screen capture trigger while displaying a second screen on the display, analyze at least one second object included in the second screen in response to the second screen capture trigger, control the display to display a recommendation crop area including at least one third object including at least some of the at least one second object visually differently from a remaining area of the second screen based on the at least one second object and the crop use pattern, and control the display to display at least one recommendation task performable on the at least one third object, based on the crop use pattern.

According to various an embodiment, the crop use pattern may further include information about a first application corresponding to the first screen, and the second screen may include an execution screen of the first application.

According to various an embodiment, information about the at least one first object may include an attribute of the at least one first object.

According to various an embodiment, the crop use pattern may include context information about the electronic device based on the first task being performed.

According to an embodiment, the at least one first object may include a first video. The first task may include storing content of a first setting related to the first video. The at least one third object may include a second video. The at least one recommendation task may include storing the content of the first setting related to the second video.

According to an embodiment, the content of the first setting may include at least one of visual content related to the first video, voice content related to the first video, text related to the voice content, or text related to the first video.

According to an embodiment, the at least one first object may include at least one first image. Information regarding the at least one first object may include information about a first subject included in the at least one first image. The at least one third object may include at least one second image. The at least one recommendation task may include sharing an image including the first subject among the at least one second image.

According to an embodiment, the at least one recommendation task may include editing the at least one second image so that an image not including the first subject among the at least one second image is hidden.

According to an embodiment, a first application corresponding to the first screen may be one among applications of a specified first group. The at least one first object may include a plurality of first graphs. The crop use pattern may further include information about the first application corresponding to the first screen. The second screen may include at least one execution screen among the applications of the first group. The at least one second object may include a plurality of second graphs. The at least one third object may include the plurality of second graphs.

According to an embodiment, the first task may include displaying the at least one first object on an execution screen of a second application. The at least one recommendation task may include displaying the plurality of second graphs on the execution screen of the second application.

According to an embodiment, the at least one processor may be configured to: identify a third screen capture trigger while displaying a third screen on the display, analyze at least one fourth object included in the third screen in response to the third screen capture trigger, identify a notification condition in response to the at least one fourth object meeting a specified format, store at least a portion of the third screen as a third image, store the notification condition corresponding with the third image, and prompt use of the third image in response to identifying that the notification condition is met.

According to an embodiment, the at least one fourth object may include a date object indicating a first date. The notification condition may include a remaining time to the first date being a specified period or less.

According to an embodiment, the at least one fourth object may include an object indicating a third party entity. The notification condition may include the electronic device being located in a place related to the third party entity.

According to, the specified format may include a ticket format. The at least one fourth object may meet the ticket format. The notification condition may include a context related to the third image being detected in a conversation through a messaging application.

According to an embodiment, an electronic device may comprise a display, a memory, and at least one processor. The at least one processor may be configured to: identify a screen capture trigger while displaying a first execution screen corresponding to a first application on the display, analyze at least one first object included in the first execution screen, and control the display to display a recommendation crop area including at least one second object including at least some of the at least one first object visually differently from a remaining area of the first execution screen based on context information about the electronic device and a result of analysis of the at least one object.

According to an embodiment, a method performed by at least one processor included in an electronic device may comprise: storing, in a memory of the electronic device, a history of information about at least one first object included in a cropped area of a first screen captured by a first screen capture trigger and a history of a first task performed on the cropped area as a crop use pattern, identifying a second screen capture trigger while displaying a second screen on a display of the electronic device, analyzing at least one second object included in the second screen in response to the second screen capture trigger, displaying a recommendation crop area including at least one third object including at least some of the at least one second object visually differently from a remaining area of the second screen based on the at least one second object and the crop use pattern, and displaying at least one recommendation task performable on the at least one third object, based on the crop use pattern.

According to an embodiment, the crop use pattern may further include information about a first application corresponding to the first screen. Displaying the recommendation crop area visually differently from the remaining area of the second screen and displaying the at least one recommendation task may be performed at least partially based on the second screen being an execution screen of the first application.

According to an embodiment, the at least one first object may include a first video. The first task may include storing content of a first setting related to the first video. The at least one third object may include a second video. The at least one recommendation task may include storing the content of the first setting related to the second video.

According to an embodiment, the at least one first object may include at least one first image. Information about the at least one first object may include information about a first subject included in the at least one first image. The at least one third object may include at least one second image. The at least one recommendation task may include sharing an image including the first subject among the at least one second image.

According to an embodiment, a first application corresponding to the first screen may be one among applications of a specified first group. The at least one first object may include a plurality of first graphs. The crop use pattern may further include information about the first application corresponding to the first screen. The second screen may include at least one execution screen among the applications of the first group. The at least one second object may include a plurality of second graphs. The at least one third object may include the plurality of second graphs.

According to an embodiment, the method may further comprise: identifying a third screen capture trigger while displaying a third screen on the display, analyzing at least one fourth object included in the third screen in response to the third screen capture trigger, identifying a notification condition in response to the at least one fourth object meeting a specified format, storing at least a portion of the third screen as a third image, storing the notification condition corresponding with the third image and storing them, and prompting use of the third image in response to identifying that the notification condition is met.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a display,
a memory, and
at least one processor comprising processing circuitry, wherein the at least one processor, individually and/or collectively, is configured to:
store, in the memory, a crop use pattern including information about at least one first object included in a cropped area of a first screen captured by a first screen capture trigger and a history of a first task performed on the cropped area of the first screen, and information about the captured first screen;
identify a second screen capture trigger while displaying a second screen of a first application on the display;
based on the second screen capture trigger, capture the second screen and identify context of the second screen by using at least one second object included in the second screen; and
based on the crop use pattern and the context of the second screen, control the display to display a recommendation crop area including a cropped area of the second screen that is visually different from a remaining area of the second screen and a notification prompting whether to share the captured first screen through the first application.

2. The electronic device of claim 1, wherein the information about the at least one first object further includes information about the first application corresponding to the first screen.

3. The electronic device of claim 1, wherein the information about the at least one first object includes an attribute of the at least one first object.

4. The electronic device of claim 1, wherein the crop use pattern includes context information about the electronic device based on the first task being performed.

5. The electronic device of claim 1, wherein the at least one processor, individually and/or collectively, is configured to control the display to display at least one recommendation task performable on at least one third object, based on the crop use pattern, wherein the at least one first object includes a first video, wherein the first task includes storing content of a first setting related to the first video, wherein the at least one third object includes a second video, wherein the at least one recommendation task includes storing the content of the first setting related to the second video, and wherein the recommendation task includes storing the content of the first setting.

6. The electronic device of claim 5, wherein the content of the first setting includes at least one of visual content related to the first video, voice content related to the first video, text related to the voice content, or text related to the first video.

7. The electronic device of claim 1, wherein the at least one processor, individually and/or collectively, is configured to control the display to display at least one recommendation task performable on at least one third object, based on the crop use pattern, wherein the at least one first object includes at least one first image, wherein information about the at least one first object includes information about a first subject included in the at least one first image, wherein the at least one third object includes at least one second image, and wherein the at least one recommendation task includes sharing an image from among the at least one second image that includes the first subject.

8. The electronic device of claim 7, wherein the at least one recommendation task includes editing the at least one second image so that an image not including the first subject among the at least one second image is hidden.

9. The electronic device of claim 1, wherein the at least one processor, individually and/or collectively, is configured to control the display to display at least one recommendation task performable on at least one third object, based on the crop use pattern, wherein the first application corresponding to the first screen is one among applications of a specified first group, wherein the at least one first object includes a plurality of first graphs, wherein the crop use pattern further includes information about the first application corresponding to the first screen, wherein the second screen includes at least one execution screen among the applications of the first group, wherein the at least one second object includes a plurality of second graphs, wherein the at least one third object includes the plurality of second graphs, wherein the first task includes displaying the at least one first object on an execution screen of a second application, and wherein the at least one recommendation task includes displaying the plurality of second graphs on the execution screen of the second application.

10. The electronic device of claim 1, wherein the at least one processor is configured to:
identify a third screen capture trigger while displaying a third screen on the display,
analyze at least one fourth object included in the third screen in response to the third screen capture trigger,
identify a notification condition in response to the at least one fourth object meeting a specified format,
store at least a portion of the third screen as a third image,
store the notification condition corresponding with the third image, and
prompt use of the third image in response to identifying that the notification condition is met.

11. The electronic device of claim 10,
wherein the at least one fourth object includes a date object indicating a first date, and
wherein the notification condition includes a remaining time to the first date being a specified period or less.

12. The electronic device of claim 10,
wherein the at least one fourth object includes an object indicating a third party entity, and wherein the notification condition includes the electronic device being located in a place related to the third party entity.

13. The electronic device of claim 10,
wherein the specified format includes a ticket format,
wherein the at least one fourth object meets the ticket format, and
wherein the notification condition includes a context related to the third image being detected in a conversation through a messaging application.

14. A method performed by an electronic device including at least one processor, the method comprising:

storing, in a memory of the electronic device, a crop use pattern including information about at least one first object included in a cropped area of a first screen captured by a first screen capture trigger and a history of a first task performed on the cropped area of the first screen, and information about the captured first screen;

identifying a second screen capture trigger while displaying a second screen of a first application on a display of the electronic device;

based on the second screen capture trigger, capture the second screen and identify context of the second screen by using at least one second object included in the second screen; and based on the crop use pattern and the context of the second screen, displaying a recommendation crop area including a cropped area of the second screen that is visually different from a remaining area of the second screen and a notification prompting whether to share the captured first screen through the first application.

15. The method of claim 14, comprising displaying at least one recommendation task performable on at least one third object, based on the crop use pattern, wherein the crop use pattern further includes information about the first application corresponding to the first screen, and wherein displaying the recommendation crop area visually differently from the remaining area of the second screen and displaying the at least one recommendation task are performed at least partially based on the second screen being an execution screen of the first application.

16. The method of claim 14, wherein the information about the at least one first object includes an attribute of the at least one first object.

17. The method of claim 14, comprising displaying at least one recommendation task performable on at least one third object, based on the crop use pattern, wherein the at least one first object includes a first video, wherein the first task includes storing content of a first setting related to the first video, wherein the at least one third object includes a second video, and wherein the at least one recommendation task includes storing the content of the first setting related to the second video.

18. The method of claim 14, comprising displaying at least one recommendation task performable on at least one third object, based on the crop use pattern, wherein the at least one first object includes at least one first image, wherein information about the at least one first object includes information about a first subject included in the at least one first image, wherein the at least one third object includes at least one second image, and wherein the at least one recommendation task includes sharing an image including the first subject among the at least one second image.

19. The method of claim 14, comprising displaying at least one recommendation task performable on at least one third object, based on the crop use pattern, wherein the first application corresponding to the first screen is one among applications of a specified first group, wherein the at least one first object includes a plurality of first graphs, wherein the crop use pattern further includes information about the first application corresponding to the first screen, wherein the second screen includes at least one execution screen among the applications of the first group, wherein the at least one second object includes a plurality of second graphs, and wherein the at least one third object includes the plurality of second graphs.

20. The method of claim 14, further comprising:

identifying a third screen capture trigger while displaying a third screen on the display;

analyzing at least one fourth object included in the third screen in response to the third screen capture trigger;

identifying a notification condition in response to the at least one fourth object meeting a specified format;

storing at least a portion of the third screen as a third image;

storing the notification condition corresponding with the third image; and prompting use of the third image in response to identifying that the notification condition is met.

* * * * *